(12) United States Patent
Lund

(10) Patent No.: US 7,661,068 B2
(45) Date of Patent: Feb. 9, 2010

(54) EXTENDED ERASER FUNCTIONS

(75) Inventor: Arnold M. Lund, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 612 days.

(21) Appl. No.: 11/451,534

(22) Filed: Jun. 12, 2006

(65) Prior Publication Data

US 2007/0285399 A1 Dec. 13, 2007

(51) Int. Cl.
*G06F 3/048* (2006.01)
*G06F 3/033* (2006.01)

(52) U.S. Cl. .................. 715/763; 715/700; 715/762; 715/863; 345/156; 345/173; 345/179

(58) Field of Classification Search ............... 345/156, 345/173, 179; 178/18.01, 18.02, 19.01, 19.04; 715/700, 762, 763, 863
See application file for complete search history.

(56) References Cited

U.S. PATENT DOCUMENTS

| 5,475,401 | A | * | 12/1995 | Verrier et al. ............... 345/179 |
| 5,483,261 | A | * | 1/1996 | Yasutake .................... 345/173 |
| 5,486,846 | A | | 1/1996 | Comer et al. |
| 5,509,114 | A | * | 4/1996 | Moran et al. ................ 345/443 |
| 5,796,406 | A | * | 8/1998 | Shigematsu et al. ......... 715/863 |
| 5,953,735 | A | * | 9/1999 | Forcier ....................... 715/273 |
| 6,195,569 | B1 | | 2/2001 | Frederiksen |
| 6,229,524 | B1 | | 5/2001 | Chernock et al. |
| 6,239,792 | B1 | * | 5/2001 | Yanagisawa et al. ........ 345/179 |
| 6,249,606 | B1 | | 6/2001 | Kiraly et al. |
| 6,271,835 | B1 | | 8/2001 | Hoeksma |
| 6,542,170 | B1 | | 4/2003 | Williams et al. |
| 6,989,822 | B2 | * | 1/2006 | Pettiross et al. ............. 345/179 |
| 7,259,752 | B1 | * | 8/2007 | Simmons .................... 345/173 |
| 2002/0126095 | A1 | | 9/2002 | Cheng et al. |
| 2003/0156145 | A1 | * | 8/2003 | Hullender et al. .......... 345/863 |
| 2004/0228532 | A1 | * | 11/2004 | Fernandez et al. ......... 382/187 |
| 2004/0248621 | A1 | | 12/2004 | Schon |
| 2005/0141681 | A1 | | 6/2005 | Graiger |
| 2005/0154496 | A1 | | 7/2005 | Chapman et al. |

OTHER PUBLICATIONS

"Wow! A Convertible Tablet PC!!", http://www.winona.edu/its/III/Knowledgebase/Tablet/TabletPCFAST_START_fall2005r2.doc.
"ClickTalk eNewsletter", Jul. 3, 2003 , Issue No. 27, http://www.bradfordsoftware.com/news/ClickTALK/ClickTalk27/clicktalk27.html.

* cited by examiner

*Primary Examiner*—My-Chau T Tran

(57) ABSTRACT

Various technologies and techniques are disclosed that allow an eraser to be used for additional operations. A pen feature is provided that supports various eraser gestures. An eraser gesture is detected from a pen input device. If the eraser gesture matches a supported eraser gesture, then an operation associated with the supported eraser gesture is performed. For example, a scratchout gesture made with the eraser can undo a previous erasure of text made by the eraser. A customization feature is provided that allows a user to customize some or all of the eraser gestures.

18 Claims, 15 Drawing Sheets

EXTENDED ERASER FUNCTIONS

BACKGROUND

Tablet pc's, personal digital assistants, cell phones, and various other types of devices today allow users to enter data using a pen. A basic challenge for computer interfaces that use pens as input devices is the frequent need to depart from the direct pen metaphor to select from menus or execute control key combinations to access various functions. Departing from the direct interaction at hand adds cognitive overhead which interferes with the user experience.

SUMMARY

Various technologies and techniques are disclosed that allow an eraser to be used for additional operations. A pen feature is provided that supports various eraser gestures. A few non-limiting examples of eraser gestures include scratchout, circle, tap, tap/hold, etc. An eraser gesture is detected from a pen input device. If the eraser gesture matches a supported eraser gesture, then an operation associated with the supported eraser gesture is performed. For example, a scratchout gesture made with the eraser can undo a previous erasure of text made by the eraser. A customization feature is provided that allows a user to customize some or all of the eraser gestures. In one implementation, another input (such as a key press) can be used in combination with an eraser input as part of the eraser gesture. This allows additional combinations of operations to be performed using the eraser.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
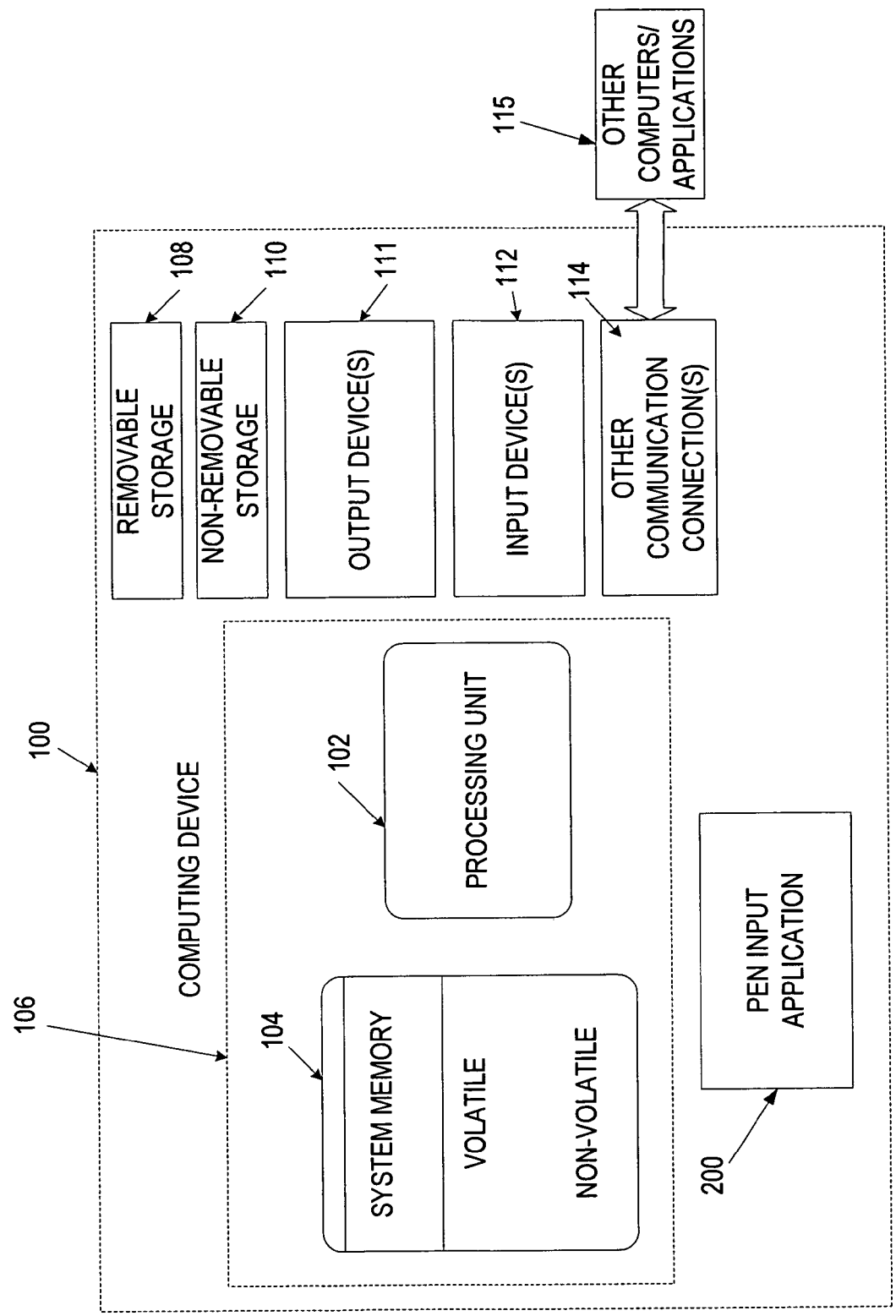
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a pen input application, but the system also serves other purposes in addition to these. In one implementation, one or more of the techniques described herein can be implemented as features within a pen input or recognition program such as a tablet input panel used in operating systems such as MICROSOFT® WINDOWS®, or from any other type of program or service that processes pen input. In another implementation, one or more of the techniques described herein are implemented as features with other applications that are capable of distinguishing between an inking end of a pen and an eraser end of a pen.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes pen input application 200. Pen input application 200 will be described in further detail in FIG. 2.

Figure 2:
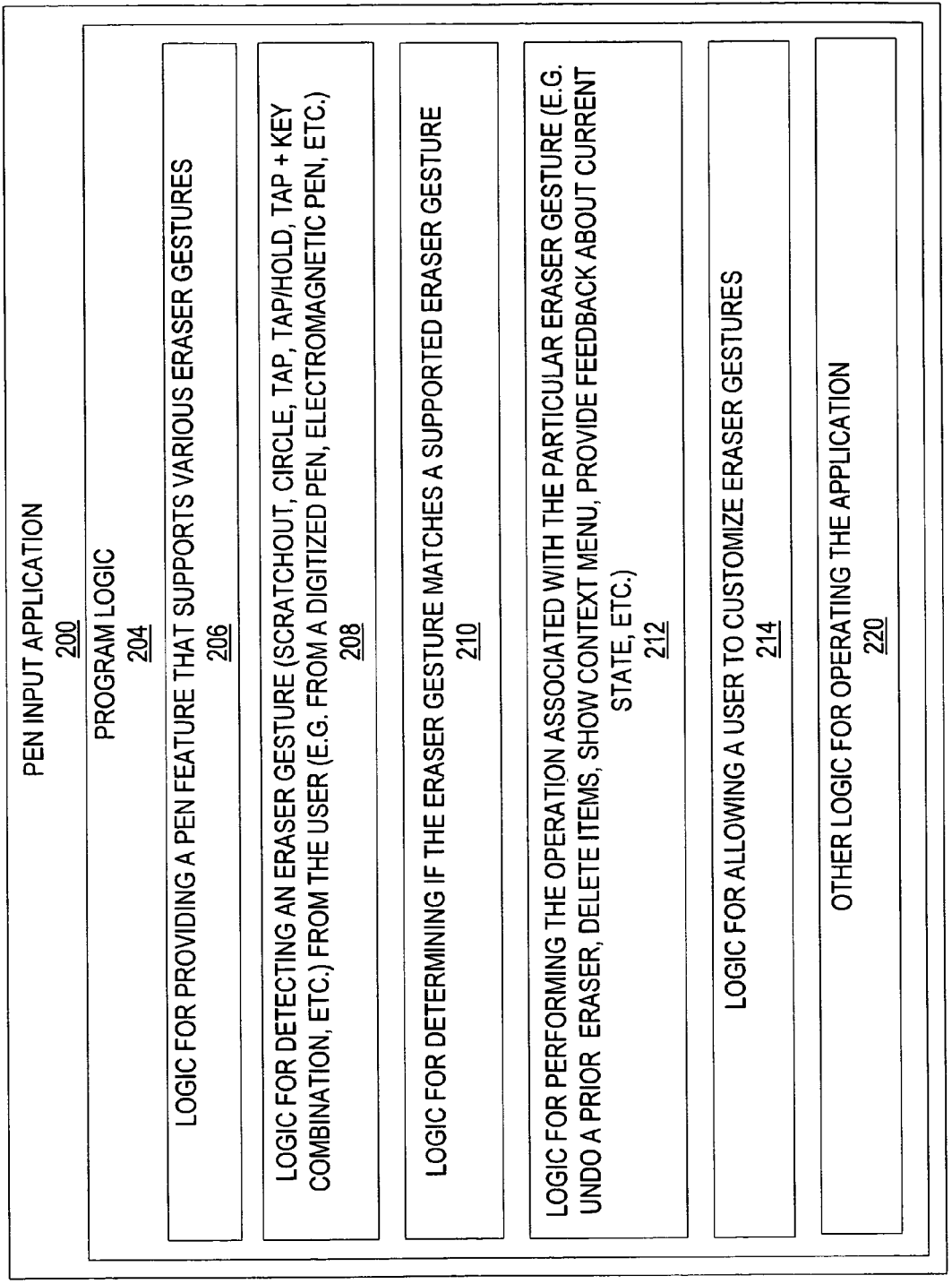
FIG. 2 is a diagrammatic view of a pen input application of one implementation operating on the computer system of FIG. 1.

Turning now to FIG. 2 with continued reference to FIG. 1, a pen input application 200 operating on computing device 100 is illustrated. Pen input application 200 is one of the application programs that reside on computing device 100. However, it will be understood that pen input application 200 can alternatively or additionally be embodied as computer-executable instructions on one or more computers and/or in different variations than shown on FIG. 1. Alternatively or additionally, one or more parts of pen input application 200 can be part of system memory 104, on other computers and/or applications 115, or other such variations as would occur to one in the computer software art.

Pen input application 200 includes program logic 204, which is responsible for carrying out some or all of the techniques described herein. Program logic 204 includes logic for providing a pen feature that supports various eraser gestures 206; logic for detecting an eraser gesture (scratchout, circle, tap, tap/hold, tap+key combination, etc.) from the user (e.g. from a digitized pen, electromagnetic pen, etc.) 208; logic for determining if the eraser gesture matches a supported eraser gesture 210; logic for performing the operation associated with the particular eraser gesture (e.g. undo a prior eraser, delete items, show a context menu, provide feedback about current state, etc.) 212; logic for allowing a user to customize eraser gestures 214; and other logic for operating the application 220. In one implementation, program logic 204 is operable to be called programmatically from another program, such as using a single call to a procedure in program logic 204.

Figure 3:
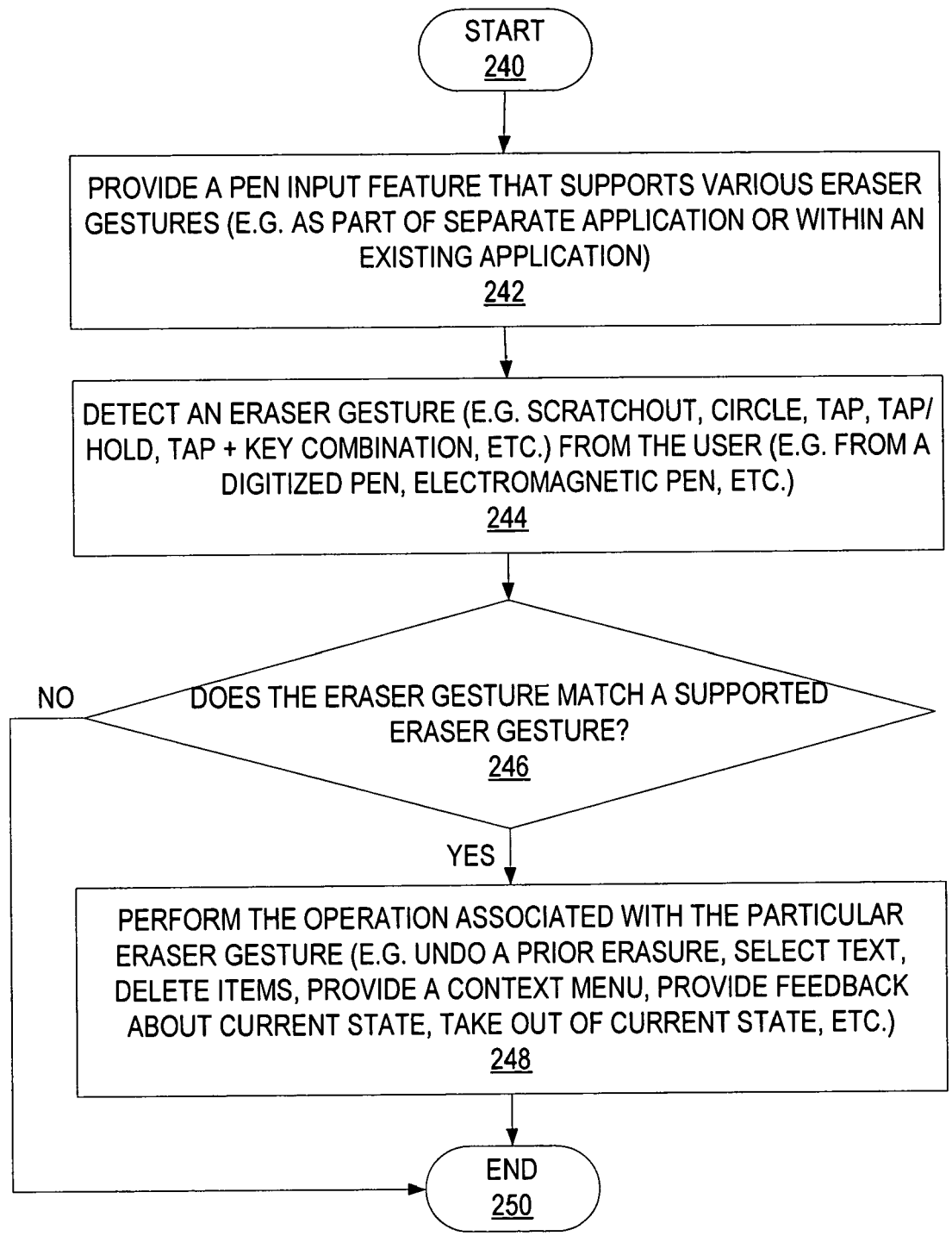
FIG. 3 is a high-level process flow diagram for one implementation of the system of FIG. 1.

Turning now to FIGS. 3-9 with continued reference to FIGS. 1-2, the stages for implementing one or more implementations of pen input application 200 are described in further detail. FIG. 3 is a high level process flow diagram for pen input application 200. In one form, the process of FIG. 3 is at least partially implemented in the operating logic of computing device 100. The procedure begins at start point 240 with providing a pen input feature that supports various eraser gestures (e.g. as part of a separate application or within an existing application) (stage 242). The system detects an eraser gesture (e.g. scratchout, circle, tap, tap/hold, tap +key combination, etc.) from the user, such as from a digitized pen, electromagnetic pen, etc. (stage 244). If the eraser gesture matches a supported eraser gesture (decision point 246), then the system performs the operation associated with the particular eraser gesture (e.g. undo a prior erasure, select text, delete items, provide a context menu, provide feedback about current state, take out of current state, etc.) (stage 248). The process ends at end point 250.

Figure 4:
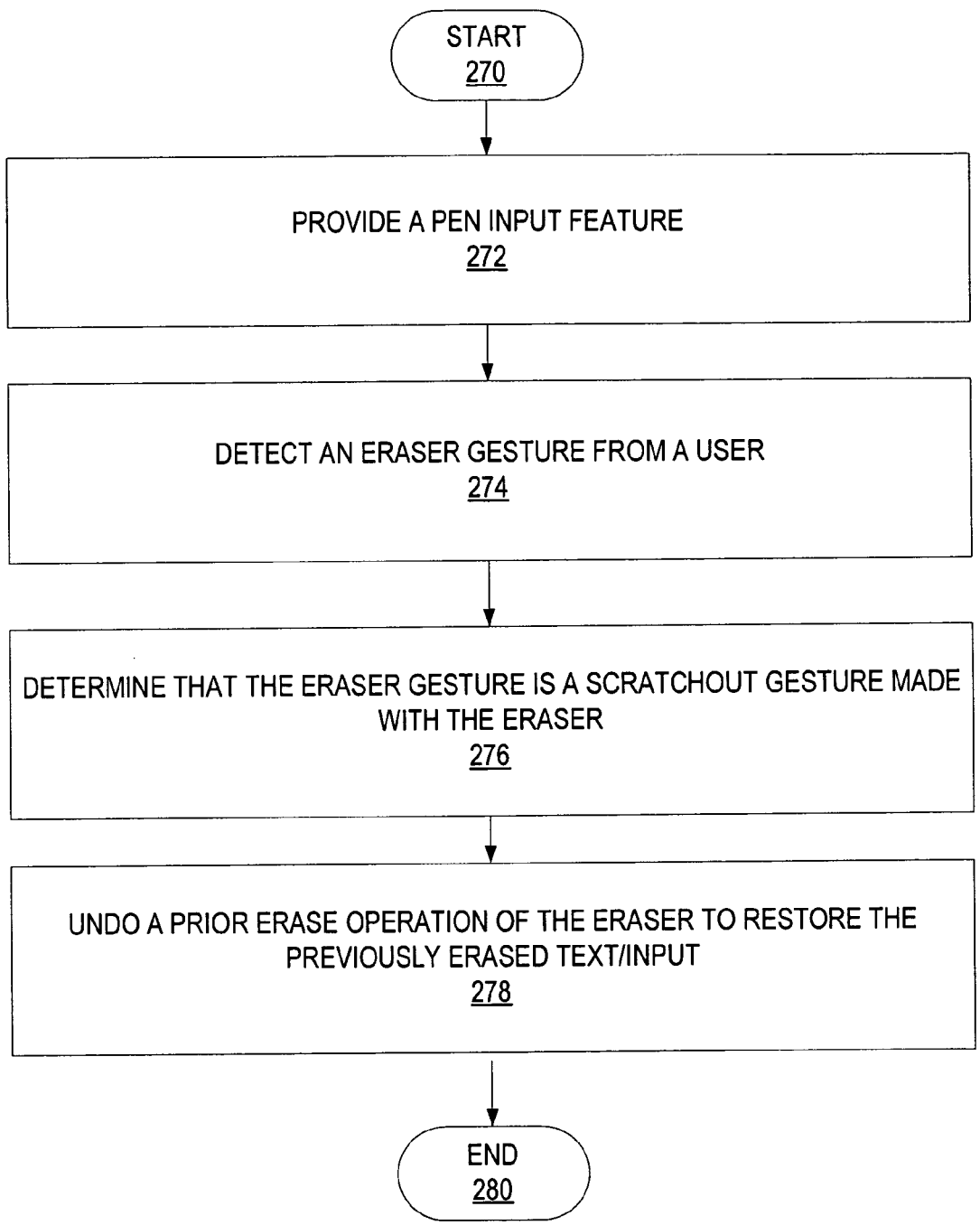
FIG. 4 is a process flow diagram for one implementation of the system of FIG. 1 illustrating the stages involved in performing an eraser scratchout gesture.

Turning now to FIG. 4, one implementation of the stages involved in performing an eraser scratchout gesture is shown. In one form, the process of FIG. 4 is at least partially implemented in the operating logic of computing device 100. The procedure begins at start point 270 with providing a pen input feature (stage 272). An eraser gesture is detected from a user (stage 274). The system determines that the eraser gesture is a scratchout gesture made with the eraser (stage 276). A prior erasure operation of the eraser is undone to restore the previously erased text (stage 278). The process ends at end point 280.

Figure 5:
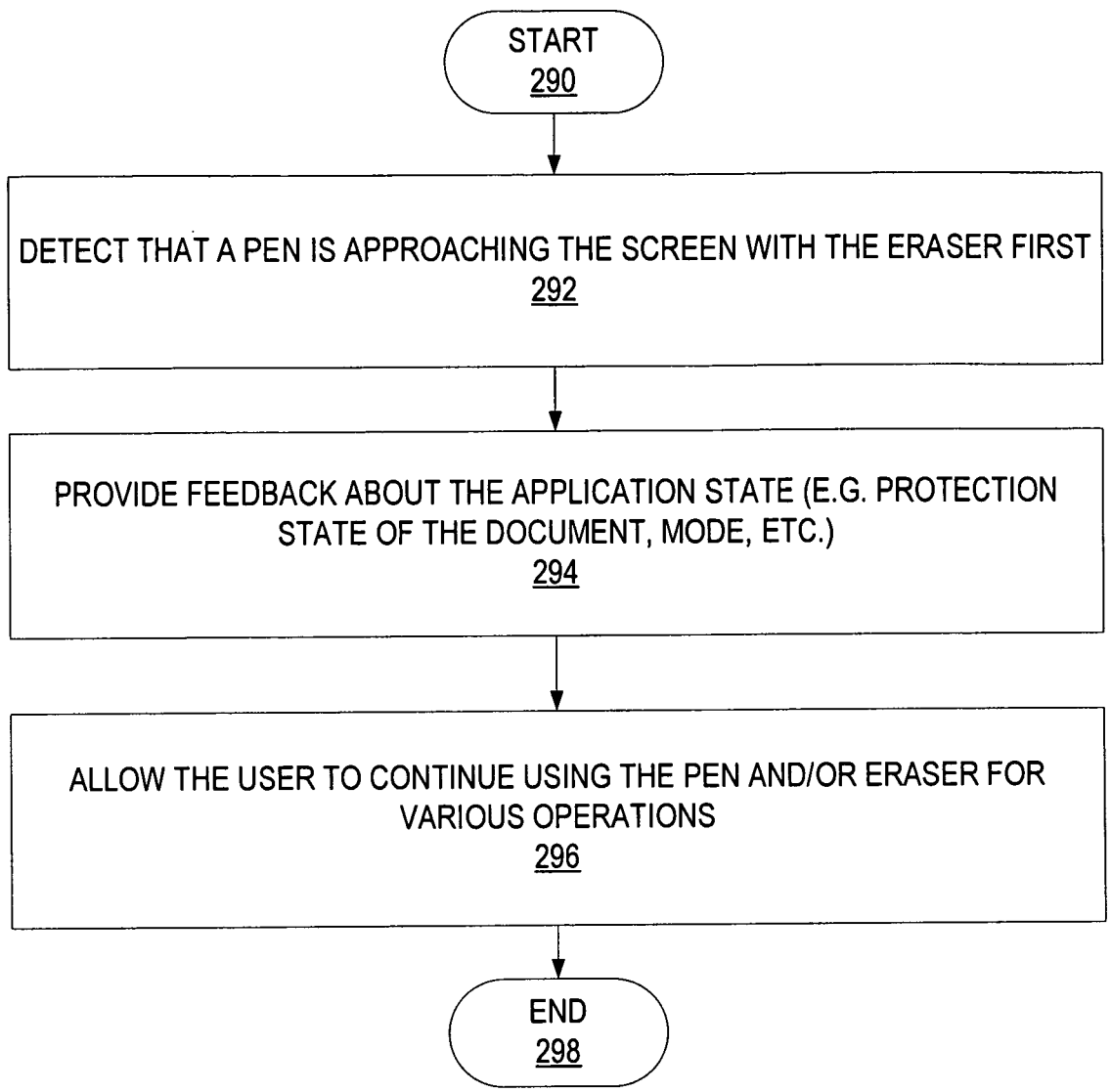
FIG. 5 is a process flow diagram for one implementation of the system of FIG. 1 illustrating the stages involved in providing feedback about an application's state as an eraser approaches the screen.

FIG. 5 illustrates one implementation of the stages involved in providing feedback about an application's state as an eraser approaches the screen. In one form, the process of FIG. 5 is at least partially implemented in the operating logic of computing device 100. The procedure begins at start point 290 with detecting that a pen is approaching the screen with the eraser first (stage 292). Feedback is provided about the application state (e.g. protection state of a document, mode, etc.) (stage 294). The user is able to continue using the pen and/or eraser for various operations (stage 296). The process ends at end point 298.

Figure 6:
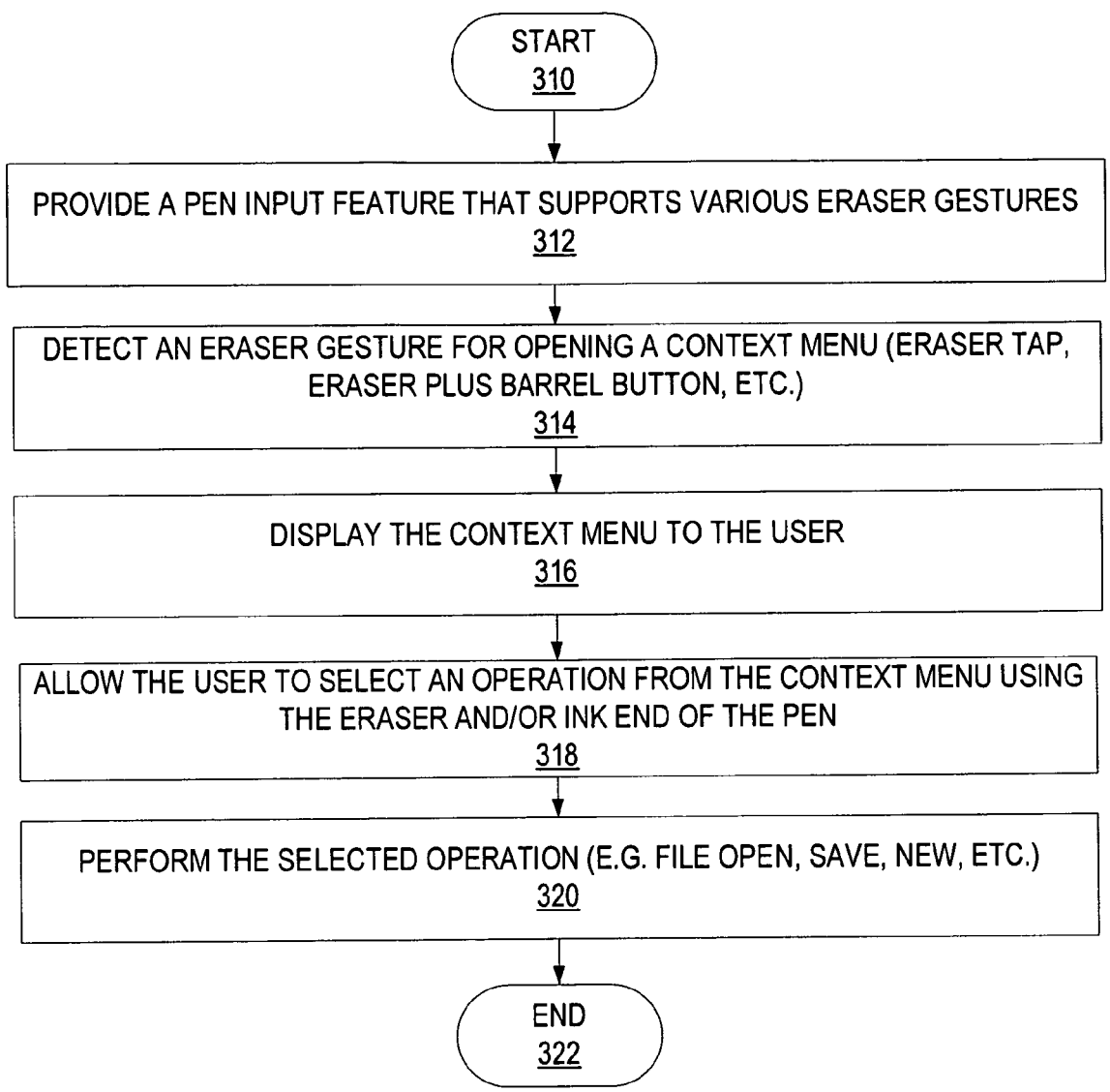
FIG. 6 is a process flow diagram for one implementation of the system of FIG. 1 illustrating the stages involved in providing an eraser context menu.

FIG. 6 illustrates one implementation of the stages involved in providing an eraser context menu. In one form, the process of FIG. 6 is at least partially implemented in the operating logic of computing device 100. The procedure begins at start point 310 with providing a pen input feature that supports various eraser gestures (stage 312). An eraser gesture for opening a context menu is detected, such as from an eraser tap, eraser plus barrel button combination, etc. (stage 314). The associated eraser context menu is shown to the user (stage 316). The user can select an operation from the context menu using the eraser and/or ink end of the pen (stage 318). The selected operation is then performed (e.g. file open, save, new, etc.) (stage 320). The process ends at end point 322.

Figure 7:
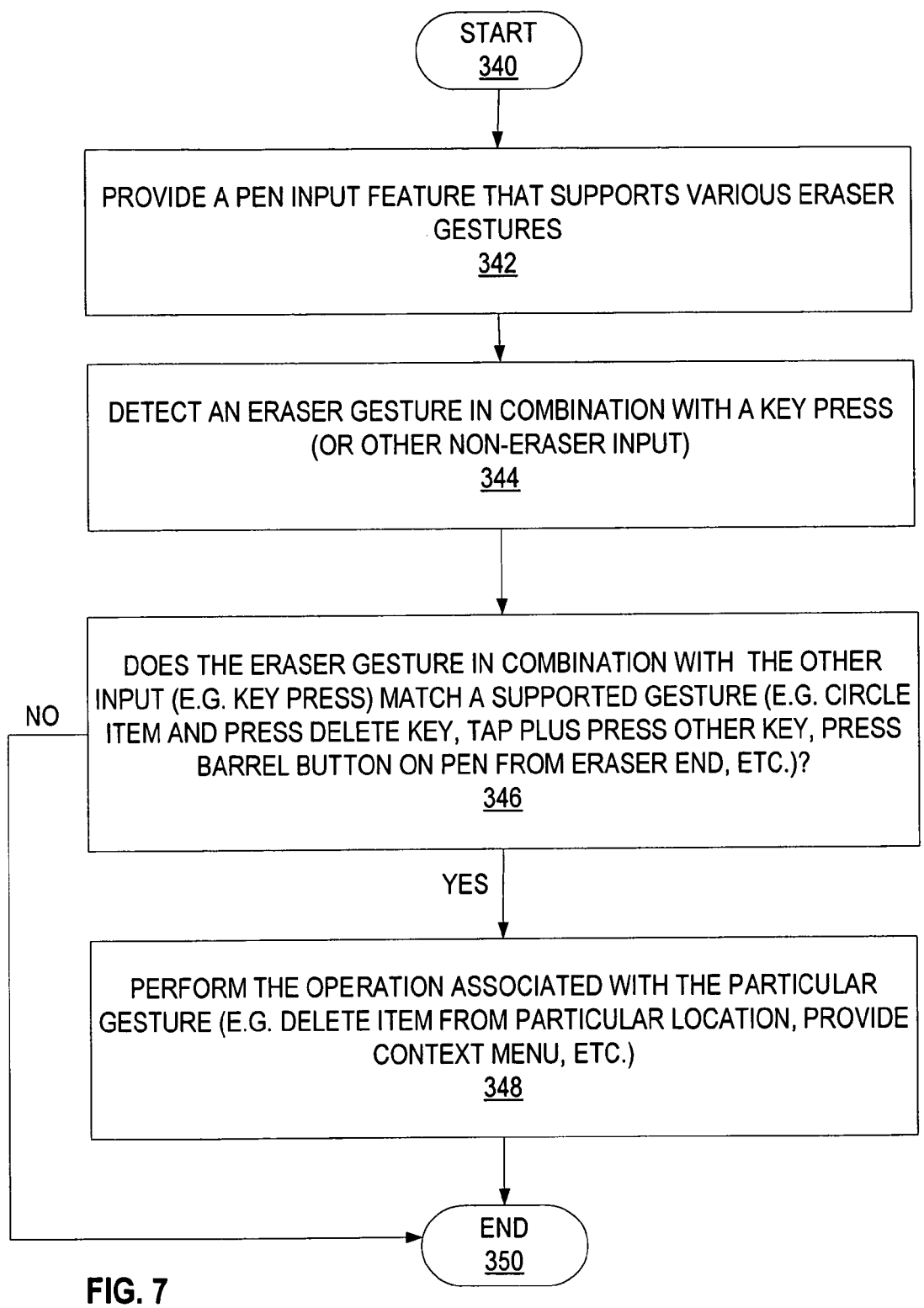
FIG. 7 is a process flow diagram for one implementation of the system of FIG. 1 that illustrates the stages involved in using an eraser in combination with another key to perform an operation.

Turning now to FIG. 7, the stages involved in one implementation of using an eraser in combination with another input to perform an operation are shown. In one form, the process of FIG. 7 is at least partially implemented in the operating logic of computing device 100. The procedure begins at start point 340 with providing a pen input feature that supports various eraser gestures (stage 342). An eraser gesture is detected in combination with a key press (or other non-eraser input) (stage 344). If the eraser input in combination with the other input (e.g. key press) matches a supported gesture (decision point 346), then the system performs the operation associated with the particular gesture (stage 348). A few non-limiting examples of eraser input plus other input combinations include circling an item with the eraser and then pressing the delete key, tapping the eraser plus pressing a particular key, pressing the barrel button on the pen from the eraser end, etc. (stage 346). A few non-limiting examples of performing as associated operation include deleting an item from a particular location, providing a context menu, etc. (stage 348). The process ends at end point 350.

Figure 8:
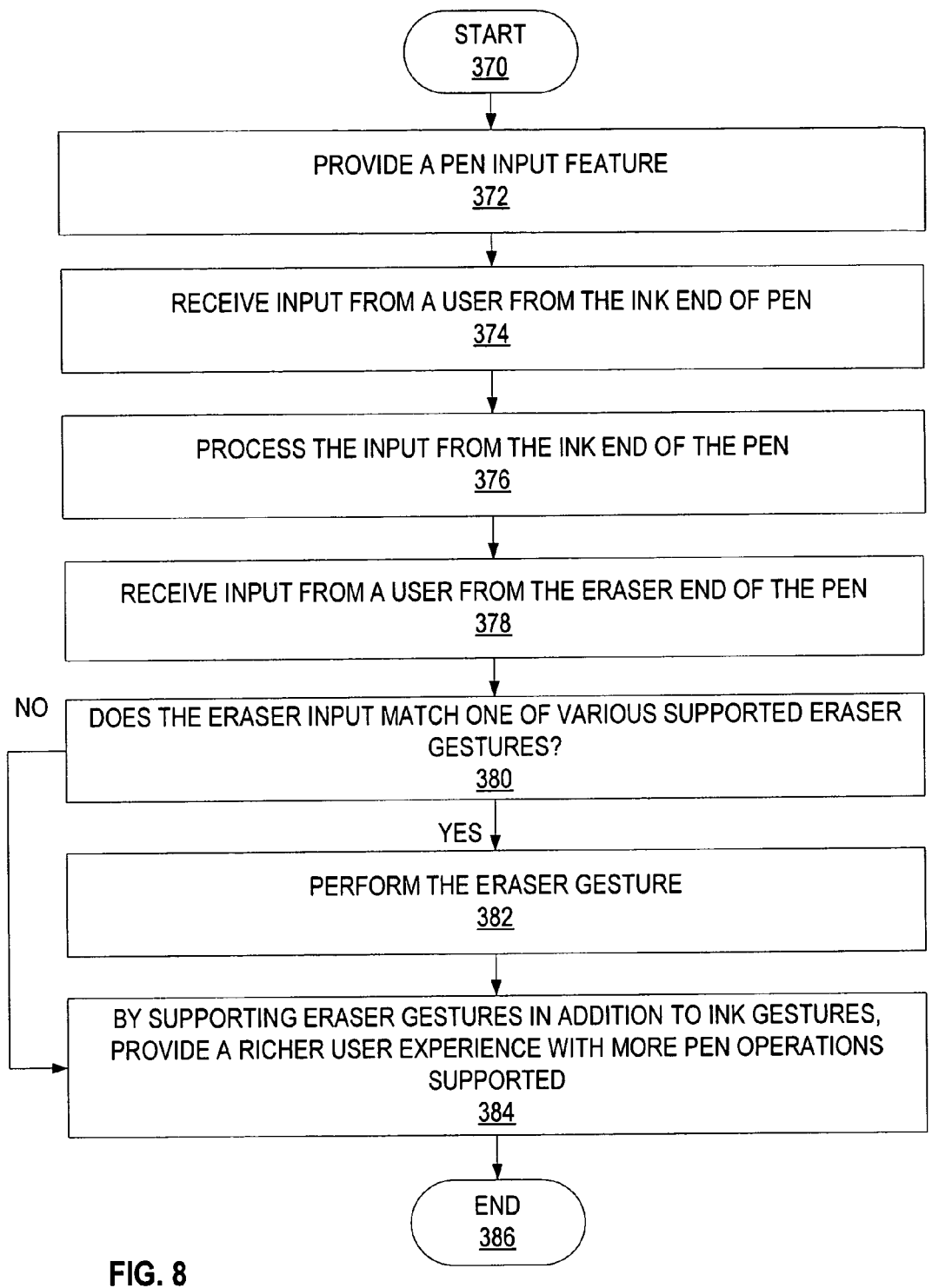
FIG. 8 is a process flow diagram for one implementation of the system of FIG. 1 that illustrates the stages involved in switching between inking end and eraser end to perform various operations.

FIG. 8 illustrates one implementation of the stages involved in switching between an inking end of a pen and an eraser end of a pen to perform various operations. In one form, the process of FIG. 8 is at least partially implemented in the operating logic of computing device 100. The procedure begins at start point 370 with providing a pen input feature (stage 372). Input is received from a user from the ink end of the pen (stage 374). The input from the ink end of the pen is processed (stage 376). Input is received from a user from the eraser end of the pen (stage 378). If the eraser input matches one of various supported eraser gestures (decision point 380), then the system performs the associated eraser gesture (stage 382). By supporting eraser gestures in addition to ink gestures, a richer user experience is provided with more pen operations supported (stage 384). The process ends at end point 386.

Figure 9:
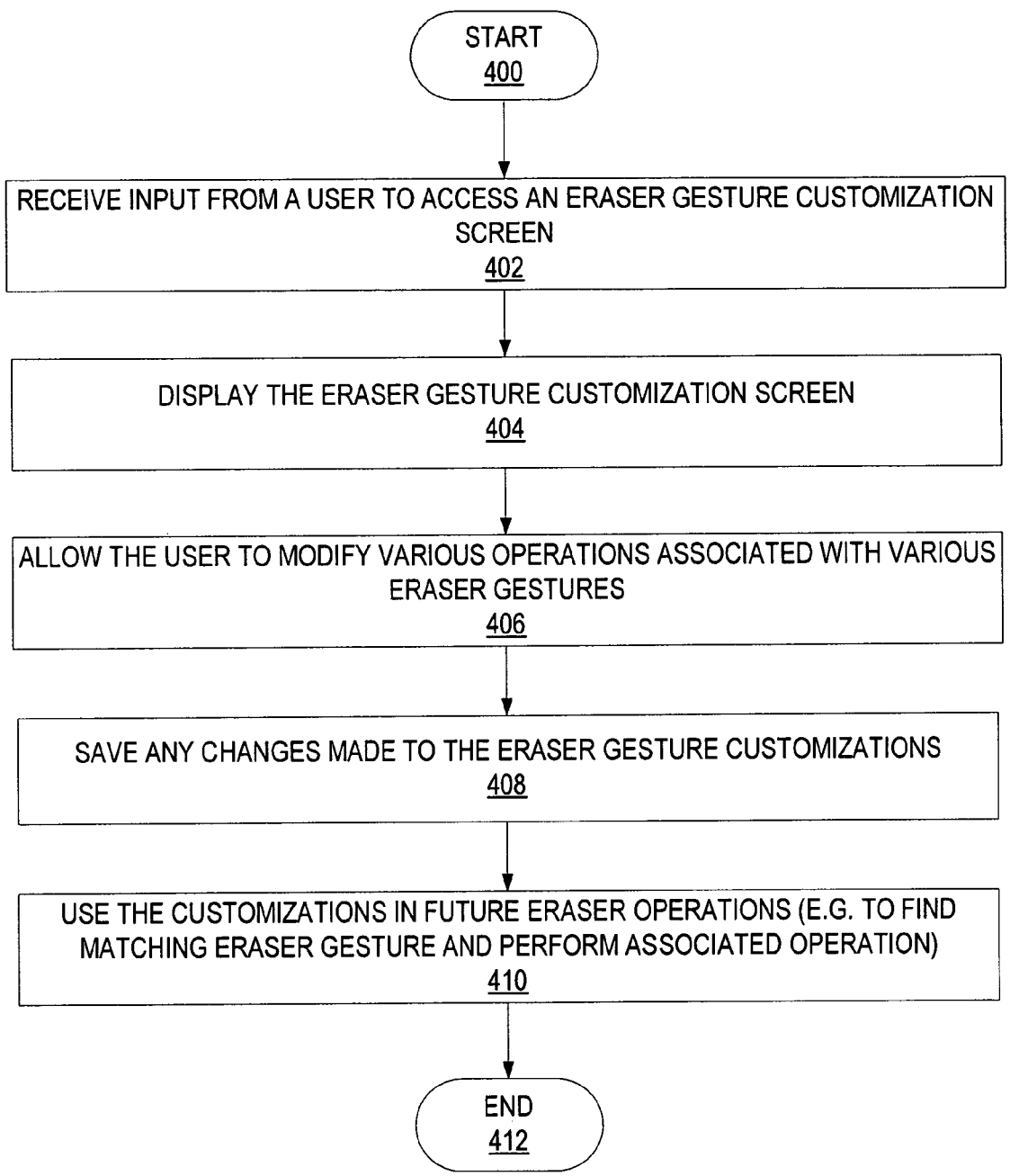
FIG. 9 is a process flow diagram for one implementation of the system of FIG. 1 that illustrates the stages involved in providing an eraser customization feature to allow end users to customize eraser gestures.

FIG. 9 illustrates one implementation of the stages involved in providing an eraser customization feature to allow end users to customize eraser gestures. In one form, the process of FIG. 9 is at least partially implemented in the operating logic of computing device 100. The procedure begins at start point 400 with receiving input from a user to access an eraser gesture customization screen (stage 402). The eraser gesture customization screen is displayed to the user (stage 404). The user can modify various operations associated with various eraser gestures (stage 406) and save any changes made to the eraser gesture customizations (stage 408). The system then uses the customizations in future eraser operations, such as to find a matching eraser gesture and perform the associated operation (stage 410). The process ends at end point 412.

Turning now to FIGS. 10-15, simulated screens are shown to illustrate using and/or customizing erasure gestures with pen input application 200, as described in the stages of FIG. 3-9. These screens can be displayed to users on output device(s) 111. Furthermore, these screens can receive input from pen-enabled input device(s) 112 that have an eraser end that the computer is capable of detecting.

Figure 10:
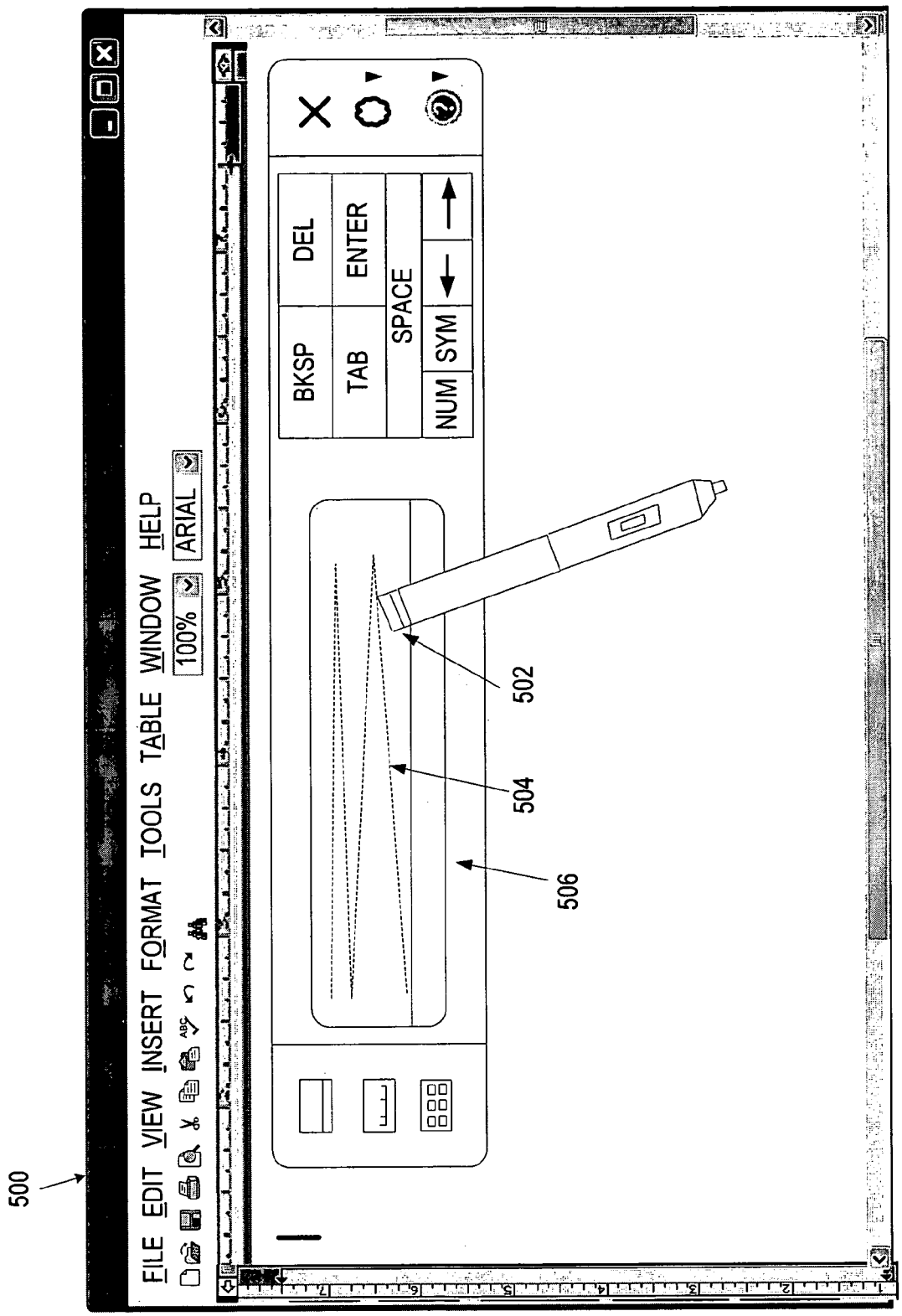
FIGS. 10 and 11 are simulated screens for one implementation of the system of FIG. 1 that illustrate using a scratchout gesture with the eraser to undo a prior erasure operation.
Figure 11:
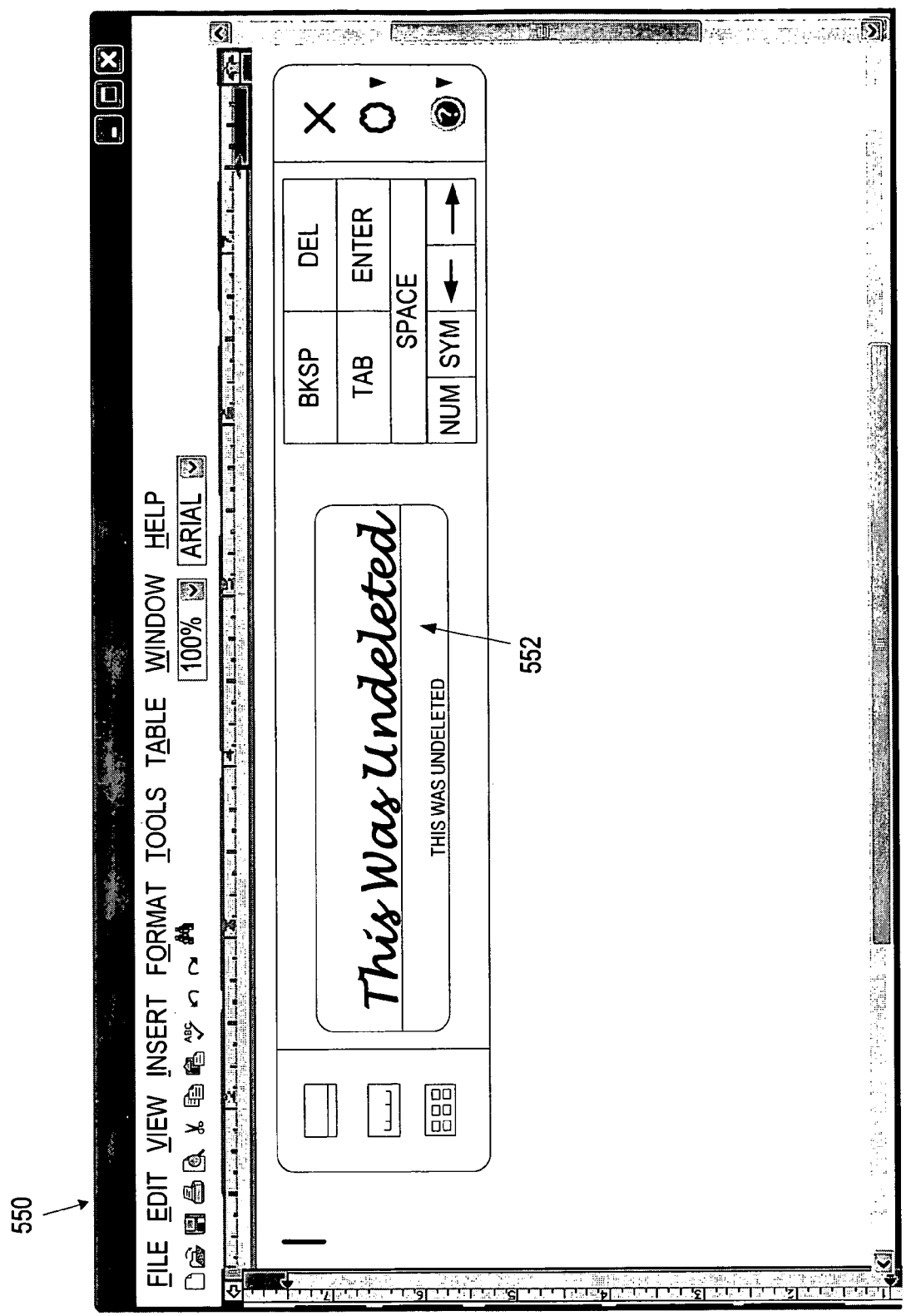

FIGS. 10 and 11 are simulated screens 500 and 550 for one implementation of the system of FIG. 1 and stages of FIG. 4 that illustrate using a scratchout gesture with the eraser to undo a prior erasure operation. The user moves the eraser end of the pen 502 in a scratchout fashion 504 in pen input area 506. In one implementation, this eraser scratchout gesture is associated with an undo erasure operation, and thus a previously erased portion of input is restored, such as text 552 on FIG. 11. Alternatively or additionally, other operations could be associated with the scratchout gesture of the eraser.

Figure 12:
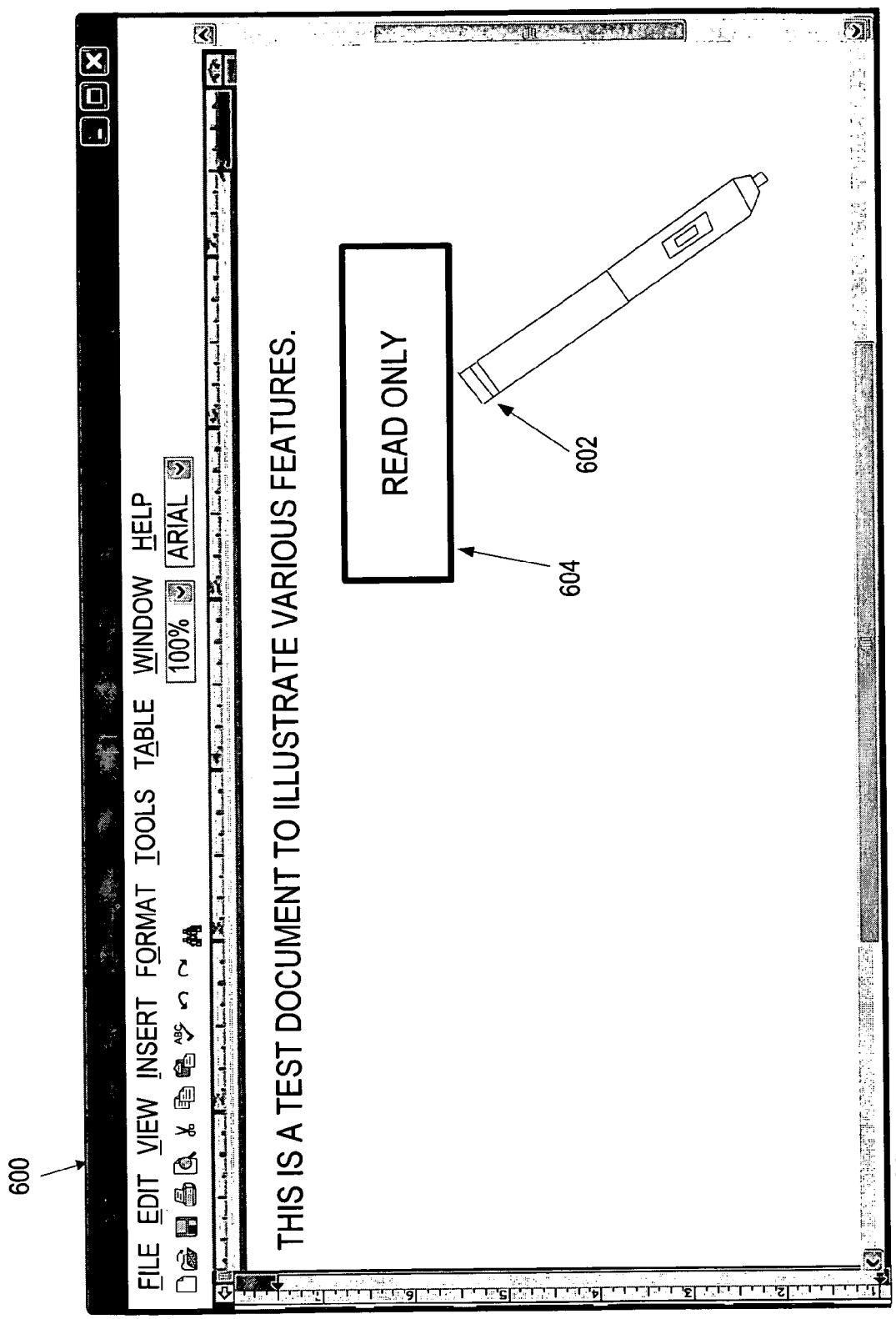
FIG. 12 is a simulated screen for one implementation of the system of FIG. 1 that illustrates providing a status of a document as the eraser approaches the screen.

Turning now to FIG. 12, a simulated screen 600 is shown that illustrates providing a status of a document 604 as the eraser 602 approaches the screen. In this example, the status 604 indicates that the document is read only and cannot be modified. Numerous other status variations could also be used to indicate a particular application and/or user status given the context of the application at that moment.

Figure 13:
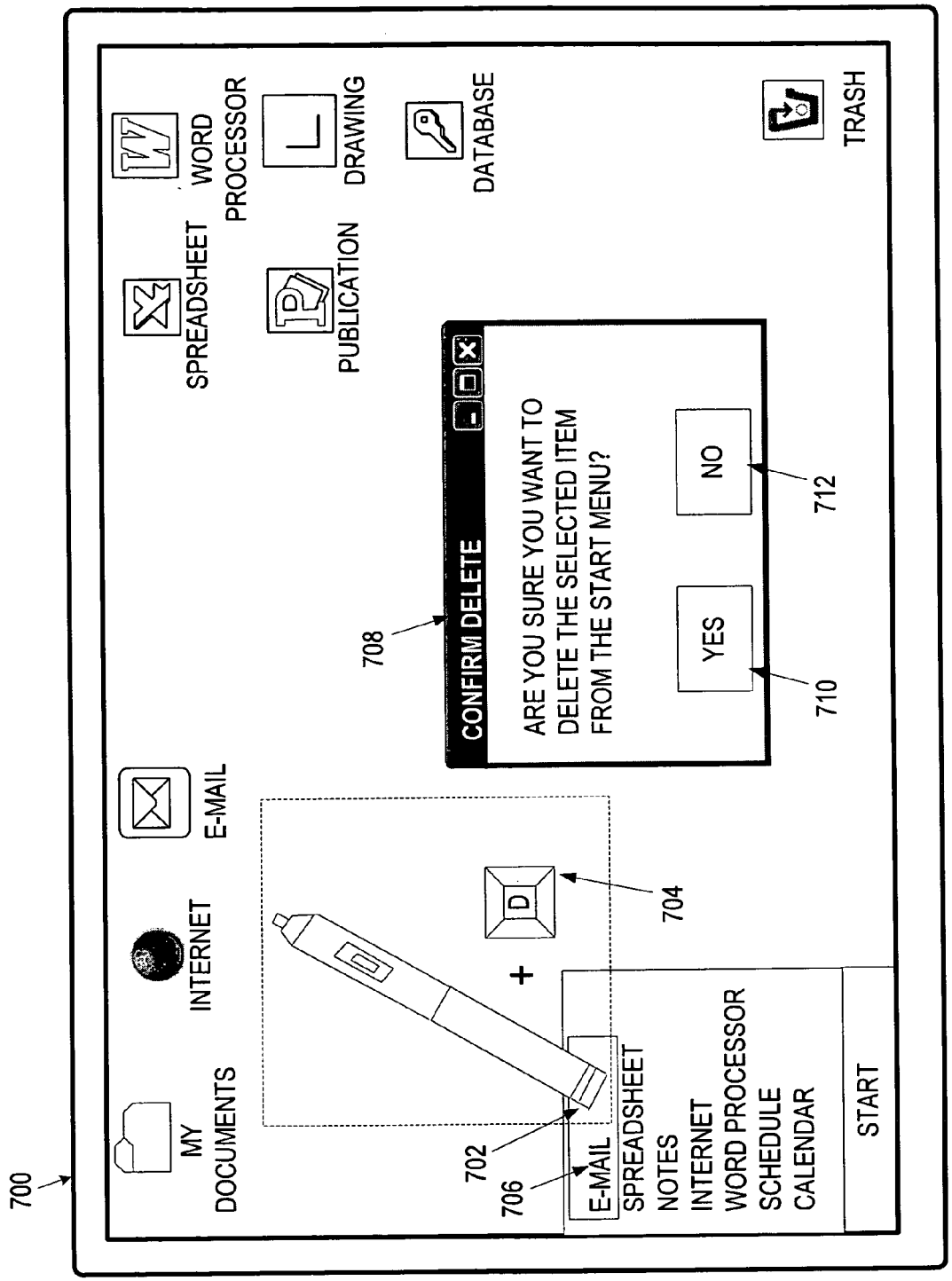
FIG. 13 is a simulated screen for one implementation of the system of FIG. 1 that illustrates using the eraser in combination with a key press to perform an operation.

FIG. 13 is a simulated screen 700 for one implementation that illustrates using the eraser 702 in combination with a key press 704 to perform an operation. In this example, the eraser 702 and the key D 704 on the keyboard are being used in combination to delete an item (in this case email item 706) from the start menu. The user is prompted to confirm the deletion in dialog 708, and upon selecting Yes Option 710, the item is deleted. If the user selects the No Option 712, the item is not deleted. Numerous other variations could also be used for using the eraser end 702 in combination with another input, such as a key press, to perform one or more operations.

Figure 14:
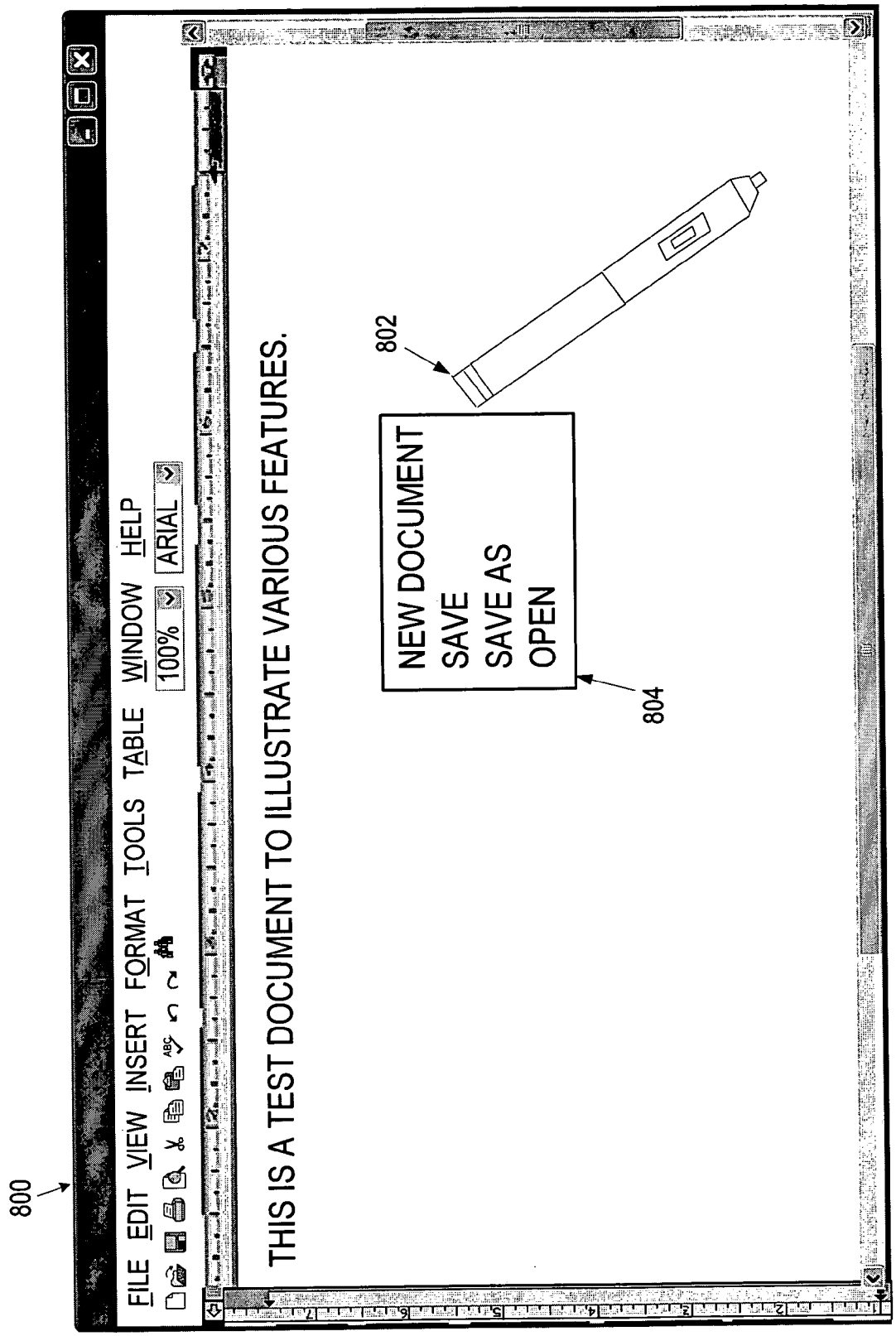
FIG. 14 is a simulated screen for one implementation of the system of FIG. 1 that illustrates providing a context menu when the eraser taps the screen.

FIG. 14 is a simulated screen 800 for one implementation that illustrates providing a context menu 804 when the eraser 802 taps the screen. In this example, the eraser context menu 804 provides various document operations, such as create new document, save document, save as document, and open document. Numerous other operations could be used in eraser context menu 804 that are appropriate given the context in which the user is working.

Figure 15:
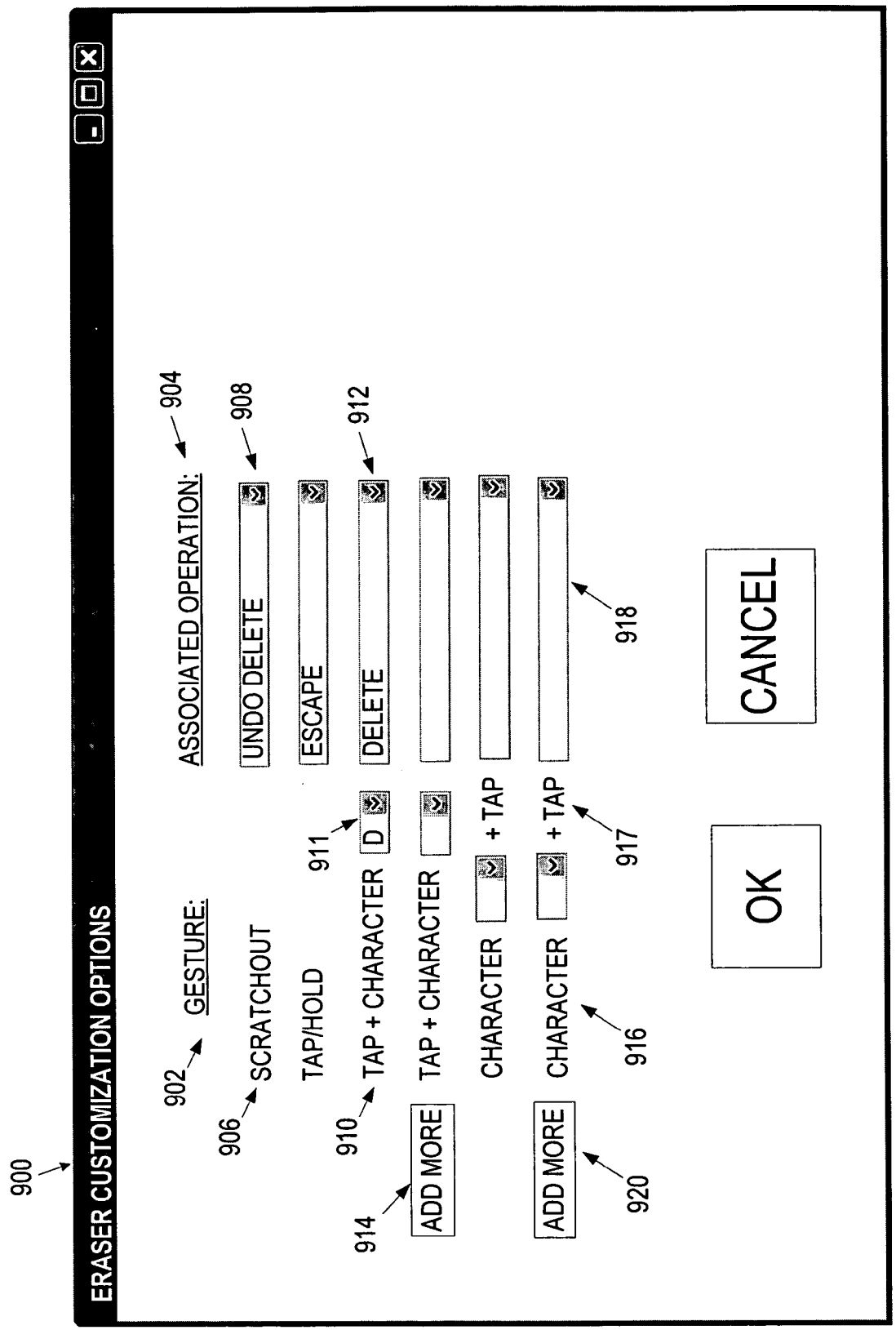
FIG. 15 is a simulated screen for one implementation of the system of FIG. 1 that illustrates allowing a user to customize eraser gestures.

FIG. 15 is a simulated screen 900 for one implementation that illustrates allowing a user to customize eraser gestures. In the simulated screen 900 shown, each gesture 902 has an associated operation 904 that can be customized by the user. For example, the scratchout gesture 906 currently shows an undo delete operation 908 as the associated operation. Other available operations can be selected from the corresponding drop-down list. A tap+character combination 910 allows the user to specify a particular character 911 that can be pressed after the tap to perform the corresponding selected operation 912. In this example, if the user performs an eraser tap plus presses the D key, then a delete operation 912 will be performed. In the example shown, additional tap+character combinations can be added by selecting the Add More Option 914. Similarly, the character 916+tap 917 gesture is shown that can be customized by the user. In this instance, the character is typed before the eraser tap to perform the associated operation 918, if any is selected. Again, if the user wishes to add more of this type of gesture, the Add More Option 920 can be selected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for using an eraser for additional operations, the method comprising:
   providing a pen feature that supports a plurality of eraser gestures;
   detecting an eraser gesture; and
   performing an operation associated with the eraser gestures;
   wherein the operation comprises providing a status of a particular application.

2. The method of claim 1, wherein the erasure gesture comprises a scratchout gesture.

3. The method of claim 2, wherein the operation comprises an undo of a prior erasure operation.

4. The method of claim 1, wherein the operation associated with the eraser gesture comprises a customizable operation.

5. The method of claim 1, wherein the pen comprises a digitized pen.

6. The method of claim 1, wherein the pen comprises an electromagnetic pen.

7. The method of claim 1, wherein the eraser gesture comprises a separate input in combination with an eraser input.

8. The method of claim 7, wherein the separate input comprises a key press.

9. The method of claim 1, wherein the eraser gesture comprises a scratchout gesture, a circle gesture, a tap gesture, a tap and hold gesture, and a tap and other input combination gesture.

10. The method of claim 1, wherein the operation comprises taking a particular application out of a current state.

11. The method of claim 1, wherein the operation comprises deleting a selected item.

12. The method of claim 1, wherein the operation comprises displaying a context menu with additional operation items selectable by a user.

13. The method of claim 12, upon selecting one of the additional operation items from the context menu, performing an additional operation associated with the selected one of the additional operation items.

14. A computer-readable medium having computer-executable instructions for causing a computer to perform the the method of claim 1.

15. A computer-readable medium having computer-executable instructions for causing a computer to perform a method comprising:
- providing a pen feature that supports a plurality of eraser gestures;
- detecting an eraser gesture;
- if the eraser gesture matches a supported eraser gesture, performing an operation associated with the supported eraser gesture; and
- providing a customization feature that allows a user to customize at least a portion of the plurality of eraser gestures;
- wherein the operation comprises providing a status of a particular application.

16. The computer-readable medium of claim 15, having computer-executable instructions for detecting the erasure gesture as a combination of an eraser input plus a separate input.

17. A method for providing a scratchout gesture with an eraser comprising:
- providing a pen input feature;
- detecting an eraser gesture from a user;
- determining that the eraser gesture comprises a scratchout gesture made with an eraser end of a pen input device;
- undoing an erasure operation previously caused by the eraser end of the pen to restore a previously erased portion of input; and
- displaying the previously erased portion of input.

18. A computer-readable medium having computer-executable instructions for causing a computer to perform the method of claim 17.

* * * * *